United States Patent [19]

Runavot et al.

[11] Patent Number: 4,698,405

[45] Date of Patent: Oct. 6, 1987

[54] RESINOUS COPOLYMER COMPOSITION BASED ON HYDROCARBONS AND THEIR USE IN ADHESIVES

[76] Inventors: Yves Runavot, 204, Boulevard de Creteil, F 94100 Saint Maur des Fosses; André Thiot, 89bis, Rue de Chailloit, F 95100 Argenteuil; Jacques Salvetat, 27, Avenue Corot, F 78110 Le Vesinet, all of France

[21] Appl. No.: 835,789

[22] Filed: Mar. 3, 1986

[30] Foreign Application Priority Data

Jul. 26, 1985 [NL] Netherlands .......................... 8502135

[51] Int. Cl.$^4$ ............................................. C08F 12/06
[52] U.S. Cl. .................................. 526/347; 526/347.1
[58] Field of Search ............................... 526/347, 347.1

[56] References Cited

U.S. PATENT DOCUMENTS

| | | | |
|---|---|---|---|
| 3,640,981 | 2/1972 | Davis | 526/347 |
| 3,956,250 | 5/1976 | Campbell et al. | 526/347 |
| 4,230,836 | 10/1980 | Canterino | 526/347 |
| 4,306,049 | 12/1981 | Prapas | 526/347 |
| 4,357,459 | 11/1982 | Runavot et al. | 528/205 |
| 4,361,506 | 11/1982 | Russo | 526/347 |
| 4,362,854 | 12/1982 | Prapas | 526/347 |
| 4,412,030 | 10/1983 | Runavot et al. | 524/505 |

Primary Examiner—Paul R. Michl
Attorney, Agent, or Firm—Cushman, Darby & Cushman

[57] ABSTRACT

A resinous copolymer composition essentially made up of a vinyl-aromatic monomer and at least one other hydrocarbon having a copolymerizable unsaturation, optionally together with one or more further copolymerizable compounds selected from the group comprising substituted benzene compounds, unsaturated carboxylic acid compounds and conjugated dienic compounds. This copolymer composition comprises at least 5% by weight of paramethylstyrene units, in a proportion at least equal to any amount of metamethylstyrene present in said copolymer composition and a resinous copolymer composition comprising at least 40% by weight of paramethylstyrene together with at least one other hydrocarbon monomer having a copolymerizable unsaturation, and optionally one or more further copolymerizable compounds selected from the group comprising substituted benzene compounds, unsaturated carboxylic acid compounds, and conjugated dienic compounds.

11 Claims, No Drawings

RESINOUS COPOLYMER COMPOSITION BASED ON HYDROCARBONS AND THEIR USE IN ADHESIVES

The invention relates to resinous copolymer compositions based on a vinylaromatic hydrocarbon and at least one other hydrocarbon having a copolymerizable unsaturation, optionally together with one or more further copolymerizable compounds. In particular the copolymer compositions according to this invention are based on a vinylaromatic hydrocarbon and at least one other hydrocarbon monomer selected from the group comprising vinylaromatic compounds, dicyclopentadienic compounds, indenic compounds and terpenic compounds, optionally together with one or more further polymerizable compounds selected from the group comprising substituted benzene compounds, unsaturated carboxylic acid compounds and conjugated dienic compounds.

Such resinous copolymers are known for instance from:

U.S. Pat. Nos. 3,932,332 and 3,956,250 which disclose resinous compositions comprising copolymers of α-methylstyrene and styrene and compositions comprising copolymers of α-methylstyrene and vinyltoluene;

EP-A-0023061 which discloses hydrocarbon resins containing dicyclopentadiene, a vinylaromatic hydrocarbon and a mono-, di-, or trisubstituted benzene;

EP-A-0025241 which discloses resins based on α-methylstyrene, styrene and phenol.

Resinous copolymer compositions of this type are known to possess relatively high softening points and good compatibility with natural or synthetic elastomers, satisfactory peel strength, shear adhesion and tack, wich makes them suitable for use in hot melt and pressure sentive adhesives.

It has now been found that the properties of such resinous copolymer compositions are still considerably improved when paramethylstyrene is used as vinylaromatic comonomers.

The resinous copolymer compositions according to the invention are made up of one vinylaromatic monomer and at least one other hydrocarbon having a copolymerizable unsaturation, optionally together with one or more further copolymerizable compounds selected from the group comprising substituted benzene compounds, unsaturated carboxylic acid compounds and conjugated dienic compounds, and characterisitically comprise at least 5% by weight of paramethylstyrene units as constituting monomer in a proportion at least equal to any amount of metamethylstyrene present in said copolymer.

In particular the resinous copolymers according to the invention preferably comprise at least 25% by weight of paramethylstyrene and most preferably at least 40% by weight.

The use of paramethylstyrene as a (co-)polymerizing monomer is discussed in Mobil Chemical Thechnical Bulletin, January 1982; in particular reference is made to the replacement of vinyltoluene mixtures by paramethylstyrene in vinylaromatic/polyester resin mixtures for coatings, sealants and adhesives applications.

In view of the results obtained in polyester resins it appears quite surprising that in respect of the very specialistic properties involved in tackyfiing hydrocarbon resins, so considerable improvements may still be achieved due to the use of paramethylstyrene.

The other hydrocarbon monomer comprising a copolymerizable unsaturation to be used with paramethyl styrene, in accordance with this invention is in particular selected from the group comprising vinylaromatic compounds, dicyclopentadienic compounds, indenic compounds and terpenic compounds.

Vinylaromatic compounds that may be used in combination with paramethylstyrene, in accordance with the invention, comprise for instance styrene, α-methylstyrene, metamethylstyrene, orthomethylstyrene, vinyltoluene (being a mixture of about ⅓ paramethyl styrene and ⅔ metamethylstyene), or mixtures thereof. The pure compounds can be used but technical grades or concentrates containing at least 60% or rather 80% by weight of one or more vinylaromatic compounds can be used with advantage.

Dicyclopentadienic compounds that may be used in accordance with the invention comprise not only unsubstituted dicyclopentadiene as such, but also substituted dicyclopentadiene. The dicyclopentadienic compounds can be used as the pure chemical compounds but it is often advantageous to use a concentrate or technical grade containing 60% or rather 80% by weight or more of the compound.

Indenic compounds that may be used in accordance with the invention also comprise not only unsubstituted indene as such but also substituted indene, and here also concentrates or technical grades containing 60% or rather 80% by weight or more of the compound may be used.

Terpenic compounds that may be used in accordance with the invention comprise for instance β-pinene, α-pinene, limonenes, carenes and such compounds referred to as dipentenes. In general concentrates or technical grades containing at least 60% or 80% by weight of said compounds are used.

According to an optional embodiment of the invention resins having a superior compatibility with ethylene vinyl acetate copolymers are obtained if the hydrocarbon resin is 'alkylated', i.e. by incorporation into the resin of substituted benzene. The substituted benzene compounds which may optionally be used in the copolymers according to the invention are preferably selected from mono-, di- and trisubstituted benzene in which the substituents are chosen among $C_1$–$C_{12}$ alkyl, hydroxyl and halogen.

Preferred examples of suitable substituted benzenes are for instance phenols which may have the structural formula

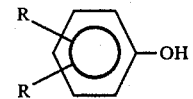

in which R represents hydrogen or a $C_1$–$C_{12}$ alkyl group, preferably a $C_6$–$C_{10}$ alkyl group. They can be used in the form of technical grade compounds (purity above 95%). Depending on the nature and reactivity, some of these impurities may be built into the resin.

Those resins are preferred which comprise a combination of a phenol and a $C_6$–$C_{10}$ monoalkyl phenol such as e.g. octyl phenol, for use in adhesives. Other preferred examples of suitable substituted benzene compounds include toluene, ethylbenzene, xylenes, mesitylene, trimethylbenzenes, and other alkylbenzenes. The amount of substituted benzene in the copolymers according to this optional embodiment of the invention preferably range from 2 to 15% by weight of substituted benzene, and most preferably from 3 to 10% by weight. Depending on the average molecular weight of the copolymers this corresponds to about 0,5 to 1,5, preferably 0,8 to 1,2 molecules of substituted benzene per average molecule of copolymers, so that the majority of the resin molecules are believed to contain a substituted benzene (i.e. an 'alkylated') group. However the 'alkylating' agent may be present in the reaction mixture in higher molar ratios than indicated above and partly act as a solvent, which is distilled off after termination of the reaction.

The copolymers according to the invention may optionally comprise unsaturated carboxylic acid units, such as resulting from for instance unsaturated monocarboxylic acids and $C_1$-$C_{12}$ alkylesters thereof, unsaturated dicarboxylic acids and acid anhydrides. Suitable examples are acrylic and methacrylic acids and their esters, such as in particular 2-ethylhexylacrylate, and maleic anhydride.

The amount of unsaturated acid compound in the copolymers according to this optional embodiment of the invention preferably range from 2 to 20 by weight, and most preferably from 3 to 10% by weight.

The copolymers according to the invention, and more preferably those based on paramethyl styrene and dicyclopentadienic compounds may optionally comprise units deriving from conjugated dienic compounds. Preferred dienic compounds are for instance pentadiene, and most preferably piperylene, i.e. 1.3-pentadiene (cis and trans). Copolymers containing pentadiene, in particular piperylene, are preferred when a higher tack with respect to polyester and polyolefin substrates is desired. Pure piperylene can be used, but usually technical grade pentadiene or piperylene concentrates containing more than 45% of pure pentadienes can be used, provided they contain less than 5% of isoprene, the remainder being monoenes, dicyclopentadiene, methyl cyclopentadiene and non-polymerisable products. The optional amount of dienic compound in the copolymers according to the invention preferably ranges from 2 to 20% by weight, and most preferably from 3 to 10%.

The resins according to the invention usually show softening points (Ring & Ball according to ASTM E28) of about 100° to 120° C., which is considerably high compared to the softening points of the state of art resins, which are in the order of 70°-90° C. The compatibility with elastomers, such as natural and synthetic rubbers, is excellent, giving typical cloud points below 30° C. and even yielding clear mixtures at room temperature. The average molecular weight of these resins preferably ranges from about 400 to 2,000.

The resins according to the invention can be prepared by reacting, optionally in the presence of a hydrocarbon solvent e.g. methylcyclohexane or toluene, the desired amounts of starting materials and a small amount of a Friedel-Crafts type catalyst, for instance $BF_3$, $AlCl_3$, $TiCl_4$ or a complex thereof with e.g. ether or phenol, and keeping the reaction temperature between $-10°$ and 80° C., preferably between 20° and 50° C.

Slow addition of the catalyst—which is preferably $BF_3$ or a complex thereof—may be recommendable in view of the exothermic nature of the reaction. Special measures to control the temperature during the reaction may be required to secure satisfactory and reproducible technical results. The reaction mixture is kept for several hours at the desired reaction temperatures ($-10°$-80° C.), after which the catalyst is destroyed, preferably with an hydroxide and washing whereafter the volatiles e.g. solvent and any unreacted starting material, are removed.

The resins according to the present invention can advantageously be used in adhesives, more particularly in hot-melt adhesvies which do not require the presence of organic solvents. The compatibility of the resin with rubber is excellent (50:50 mixtures).

In some instances elastomers like rubber and certain ethylene-vinyl acetate copolymers (EVA), ethylacrylate copolymers (EEA) and amorphous polypropylene (APP) can be used either in combination or separately, together with these resins in hot-melt pressure-sensitive adhesives formulations.

The present invention also provides pressure-sensitive adhesives which are mixtures of a resin in accordance with the invention and an elastomer such as natural or synthetic rubber. As natural rubber crude gum can be used and as synthetic rubbers any thermoelastomer, such as styrene butadiene styrene (SBS) and e.g. styrene isoprene styreen (SIS) block copolymers.

The resins and elastomer can be combined in weight ratios of between 0.3 to 3 parts of resin per part of rubber, preferably between 0.5 and 2. Optional further ingredients such as waxes, tackifying oils (usually a napthenic oil) and stabilizers against oxidation and ultraviolet light can be incorporated in minor amounts. The resin and rubber are melted at a temperature ranging from about 80° to 200° C. and kept at this temperature for 10-30 minutes. Sometimes, better results are obtained by combining more than one type of rubber or more than one type of resin. The use of solvents (aliphatic or aromatic hydrocarbons, chlorinated derivatives thereof or e.g. ketones) is often superfluous, though the usual adjuncts, such as anti-oxidants, fillers and the like may be incorporated in minor amounts.

In another embodiment of the present invention hot-melt adhesives are provided, which comprise substantially a mixture of an ethylene-vinyl-acetate copolymer containing at least 20, and at most 55% by weight of vinyl acetate, and hydrocarbon copolymer resin as described above, optionally with a microcrystalline and-/or paraffin wax and/or a tackifying oil. The amounts by weight of hydrocarbon resin and EVA-copolymer can range between 35:65 and 60:40, preferably between 40:60 and 50:50. The ethylene-vinyl acetate copolymer to be applied contains from 25 to 55%, preferably 28 to 50%, by weight of vinyl acetate.

Mixing of resin a copolymer is effected in the melt at a temperature of 150°-200° C., preferably 160°-180° C. for 15-60 minutes. Also minor quantities of antioxidants may be present. By this process hot-melt adhesives can be provided which are particularly suitable for packaging, bookbinding or the manufacture of disposables, such as diapers, sanitary towels, disposable dressings, packaging tapes, masking tapes for automobile windows, carpet-laying tapes, labels, floor tiles, wall coverings, automobile upholstery, etc.

The non-pressure-sensitive hot melts as formulated herein are characterized by superior adhesion, hot and cold resistance and stability and as such are suitable for packaging, bookbinding and non-pressure-sensitive disposables applications.

The invention is illustrated by the following Examples.

EXAMPLES

Hydrocarbon copolymer resin based on paramethylstyrene, alpha-methylstyrene and phenol.

EXAMPLE 1

60 parts by weight of paramethylstyrene and 31 parts by weight of alpha-methylstyrene were mixed with 9 parts by weight of phenol, and dissolved in 120 parts by weight of toluene. Subsequently 0.25% of gaseous boronfluoride ($BF_3$) was added to the reaction mixture, kept for 5 hours at 20° C. After this the catalyst was neutralized with NaOH and washed and the volatiles were distilled off. One obtained a resin I having a Ring and Ball softening point of 100° C. (according to ASTM E28/67) and a Gardner colour below 1. The hydrocarbon copolymer resin was compatible with ethylene-vinyl acetate copolymers containing 15–40% of vinylacetate, with microcrystal waxes, paraffines, polyethylene waxes and natural and synthetic rubbers.

EXAMPLE 2

Using the procedure of example 1, a further copolymer resin was prepared based on the following reaction mixtures:
45 parts by weight of paramethylstyrene
45 parts by weight of alpha-methylstyrene
10 parts by weight of phenol
120 parts by weight of toluene.
A resin II having a Ring and Ball softening point of 100° C.±2° was obtained.

COMPARATIVE EXAMPLE 3

Hydrocarbon copolymer resin based on vinyltoluene, alpha-methylstyrene and phenol. Using the procedure of example 1 a resin was prepared based on the following reaction mixture:
60 parts by weight of vinyltoluene (i.e. 33% paramethylstyrene 66% methamethylstyrene 0.3% orthomethylstyrene)
31 parts by weight of alpha-methylstyrene
9 parts by weight of phenol
120 parts by weight of toluene.
A resin III having a Ring and Ball softening point of 83° C. was obtained.

The compatibility of resins I, II and III with various ethylene vinylacetate copolymers (comprising about 15–30% vinylacetate) and with an acid EVA-terpolymer, was tested. The results are given in table I.

TABLE I

Comparison of the compatibility of copolymers according to the invention and state of art copolymers with ethylene-vinylacetate copolymers.

| | Softening Point | compatibility with: | | | |
|---|---|---|---|---|---|
| | | Elvax 250 (27/28% vinyl-acetate) | Elvax 360 (24/25% vinyl-acetate) | Elvax 40 (17/18% vinyl-acetate) | Elvax 4360 acid ter-polymer) |
| Resin I | 100° C. | clear at room T. | clear at room T | clear at room T | clear at room T |
| Resin II | 100° C. | clear at room T. | clear at room T. | clear at room T. | clear at room T. |
| Resin III | 83° C. | clear at room T. | clear at 60° | white at room T. | cloudy at room T. |

Elvax is the trade mark of products marketed by Dupont de Nemours.

EXAMPLE 4

Using the procedure of example 1, a resin was prepared by polymerizing the following reaction mixture:
dicylopentadiene concentrate
 (85% DCPD): 20 parts by weight
 paramethylstyrene: 21 parts by weight
 trimethylbenzene: 75 parts by weight
 containing 0.4% boron trifluoride, at a temperature of 40°–45° C.
A resin was obtained having a Ring and Ball softening point above 100° C. and showing an excellent compatibility with ethylene vinylacetate copolymers.

EXAMPLE 5

Using the same procedure as in example 1, a resin was prepared by polymerising the following reaction mixture:
dicylopentadiene concentrate
 (85% DCPD): 30 parts by weight
 paramethylstyrene: 21 parts by weight
 phenol: 2.5 parts by weight
 octylphenol: 5.2 parts by weight
 2-ethylhexylacrylate: 1.5 parts by weight
piperylene concentrate
 (85% purity): 24 parts by weight
 methylcyclohexane: 30 parts by weight
 containing 0.5 borontrifluoride as catalyst, at a temperature of 25°–35° C.
The resin showed a Ring and Ball softening point of 95° C. and had the following properties:
Tack: 2 cm (by PSTC-6, ring and ball modified)
Peel adhesion: at 180° C. 600 grams per cm of ribbon
Shear adhesion (according to PST7-7 method): more than 24 hours.

EXAMPLE 6

Using the same procedure as in example 1, a resin was prepared by reacting the following mixture at a temperature of 25° C.
paramethylstyrene: 90 parts by weight
phenol: 10 parts by weight
toluene: 100 parts by weight
$BF_3$: 0.4%
The resin was obtained with a yield of 90%. The obtained resin had a Ring and Ball softening point of 140° C.

COMPARATIVE EXAMPLE 7

Using the same procedure as in example 6, a resin was prepared by reacting a mixture of
Vinyltoluene: 90 parts by weight
phenol: 10 parts by weight
toluene: 100 parts by weight
$BF_3$: 0.4%
The resin was obtained with a yield of 90%. The obtained resin has a Ring and Ball softening point of 120° C.

We claim:
1. A resinous copolymer adhesive composition essentially composed of a vinyl-aromatic monomer and at least one other hydrocarbon having a copolymerizable unsaturation, optionally together with one or more further copolymerizable compounds selected from the group consisting of substituted benzene compounds, unsaturated carboxylic acid compounds and conjugated dienic compounds, wherein said copolymer composition comprises at least 5% by weight of paramethylsty- rene units, in a proportion at least equal to the amount of metamethylstyrene, if any, present in said copolymer composition, said resinous composition having a molecular weight of from 400 to 2,000.

2. A resinous copolymer composition according to claim 1, comprising at least 25% by weight of paramethylstyrene.

3. A resinous copolymer composition comprising at least 40% by weight of paramethylstyrene together with at least one another hydrocarbon monomer having a copolymerizable unsaturation, and optionally one or more further copolymerizable compounds selected from the group comprising substituted benzene compounds, unsaturated carboxylic acid compounds, and conjugated dienic compounds, and having a molecular weight of from 400 to 2,000.

4. A resinous copolymer composition according to claim 1 wherein said other hydrocarbon monomer is selected from the group comprising vinylaromatic compounds, dicyclopentadienic compounds, indenic compounds and terpenic compounds.

5. A resinous copolymer composition according to claim 1 wherein it comprises paramethylstyrene together with at least one monomer selected from the group comprising styrene, α-methylstyrene, vinyltoluene, dicyclopentadiene, indene and terpene, and optionally one or more monomers selected from the group comprising pentadienes, unsaturated carboxylic acids and $C_1$-$C_{12}$ alkylesters thereof, unsaturated dicarboxylic acids and acid anhydrides and mono-, di- or trisubstituted benzene in which the substituents are chosen among $C_1$-$C_{12}$ alkyl, hydroxyl and halogen.

6. A resinous copolymer composition according to claim 1 wherein it comprises paramethylstyrene together with one or more comonomers of the group styrene, α-methylstyrene and vinyltoluene and optionally with phenol and/or a $C_6$-$C_{10}$ alkylsubstituted phenol.

7. A resinous copolymer composition according to claim 1 wherein it comprises paramethylstyrene together with dicyclopentadiene and with one or more comonomers of the group phenol, $C_6$-$C_{10}$ alkylphenols, $C_1$-$C_6$ alkylbenzenes and optionally with one or more comonomers of the group of vinylaromatic compounds other than paramethylstyrene, pentadienes, in particular piperylene, and $C_1$-$C_{12}$ alkyl esters of acrylic and methacrylic acid.

8. A process for preparing a resinous copolymer composition composed of
(a) 5 to 90 parts by weight of paramethylstyrene;
(b) 10 to 95 parts by weight of at least one another hydrocarbon having a copolymerizable unsaturation;
(c) 0 to 15 parts by weight of (a) substituted benzene compound(s);
(d) 0–20 parts by weight of conjugated dienic compound and
(e) 0–20 parts by weight of unsaturated carboxylic acid compounds,
are reacted at a temperature between $-10°$ and $80°$ C. in the presence of Friedel Crafts catalyst and optionally in the presence of a solvent, and wherein said resinous copolymer composition has a molecular from 400 to 2,000.

9. A process according to claim 8, wherein component (a) is used in an amount of 40 to 90%, component(s) (b) in a total amount of 10 to 60% and component(s) (c), (d) and (e) in a total amount of 0 to 10%.

10. The use of a resinous composition according to claim 1, together with an thermoelastomer, a natural or synthetic rubber or an ethylene vinylacetate copolymer containing 25–55% of vinylacetate, optionally together with a wax and/or a tackifying oil, as a hot melt adhesive.

11. A hot melt adhesive composition composed of from 20–60% by weight of the total composition of a resinous copolymer composition composed of a vinylaromatic monomer and at least one other hydrocarbon having a copolymerizable unsaturation, optionally together with one or more further copolymerizable compounds selected from the group consisting of substituted benzene compounds, unsaturated carboxylic acid compounds and conjugated dienic compounds, wherein said copolymer composition comprises at least 5% by weight of paramethylstyrene units, in a proportion at least equal to the amount of metamethylstyrene, if any, present in said copolymer composition, said resinous composition having a molecular weight of from 400 to 2,000.

* * * * *

UNITED STATES PATENT AND TRADEMARK OFFICE
CERTIFICATE OF CORRECTION

PATENT NO. : 4,698,405

DATED : October 6, 1987

INVENTOR(S) : RUNAVOT et al

It is certified that error appears in the above-identified patent and that said Letters Patent is hereby corrected as shown below:

ON THE FIRST INFORMATIONAL PAGE:

Between [76] Inventors: and [21] Appl. No.:, insert

-- Assignee: DSM Resins B.V.,
Zwolle, Netherlands --.

Signed and Sealed this

Fifth Day of September, 1989

Attest:

DONALD J. QUIGG

Attesting Officer

Commissioner of Patents and Trademarks